(12) United States Patent
McCowin (10) Patent No.: US 7,681,615 B2
(45) Date of Patent: Mar. 23, 2010

(54) TOW WIDTH ADAPTABLE PLACEMENT HEAD DEVICE AND METHOD

(75) Inventor: Peter D. McCowin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 591 days.

(21) Appl. No.: 11/196,455

(22) Filed: Aug. 4, 2005

(65) Prior Publication Data

US 2007/0029030 A1 Feb. 8, 2007

(51) Int. Cl.
*B65H 81/00* (2006.01)

(52) U.S. Cl. .................. 156/433; 156/441; 156/523; 156/573

(58) Field of Classification Search .................. 156/166, 156/169, 172, 173, 175, 433, 441, 573, 523
See application file for complete search history.

(56) References Cited

U.S. PATENT DOCUMENTS

| 4,699,683 A * | 10/1987 | McCowin .................. 156/353 |
| 4,867,834 A | 9/1989 | Alenskis et al. |
| 4,943,338 A * | 7/1990 | Wisbey ....................... 156/433 |
| 5,045,147 A * | 9/1991 | Benson et al. .............. 156/429 |
| 5,290,389 A * | 3/1994 | Shupe et al. ................ 156/425 |
| 5,560,942 A | 10/1996 | Curry |
| 5,698,066 A * | 12/1997 | Johnson et al. ............. 156/441 |
| 5,954,917 A * | 9/1999 | Jackson et al. ............. 156/433 |
| 7,472,736 B2 | 1/2009 | Kisch et al. |
| 2009/0078361 A1 | 3/2009 | Kisch et al. |

OTHER PUBLICATIONS

Ermert, W. et al "R U Reinforcing plastics with robots?", Plastics Engineering, May 1981, pp. 37-46.*

* cited by examiner

*Primary Examiner*—Jeff H Aftergut (57) ABSTRACT

A replaceable tow alignment path kit for a tow placement device may include a tow alignment tray to guide a predetermined width of tow along a tow path of a tow placement head. The tow alignment tray may include a channel having a width corresponding to the predetermined width of tow and a connector to releasably engage the tow placement head.

19 Claims, 10 Drawing Sheets

TOW WIDTH ADAPTABLE PLACEMENT HEAD DEVICE AND METHOD

FIELD OF THE INVENTION

The present invention relates to methods and apparatus for fabricating items and components from composites.

BACKGROUND OF THE INVENTION

Composite items are typically constructed from layers of material that are laminated together. The categories of materials utilized to fabricate or "layup" composite items include, for example: fiber, fabric, tape, film, and foil. Within each of these categories, a multitude of diverse materials are utilized. For example, fibers utilized include: glass, carbon, aramid, quartz, and the like. When arranged as woven sheets and unidirectional ribbons, the fibers are referred to as fabric and tape, respectively.

Fiber placement is a process used to construct or fabricate composite items. These composite items include relatively simple planar sheets or panels to relatively large complex structures. The composite items are generally built up from multiple layers or plies of composite materials that are pre-impregnated with uncured resin ("prepreg"). These plies are placed on a form by a head that is positioned by a positioning device such as a robotic arm or gantry.

Composite material are typically supplied in rolls or spools in a variety of widths. Generally, more highly contoured composite items are fabricated from relatively narrower composite materials. Composite materials having a width of about ⅛ inch to about 1 inch are typically referred to as "tow," and often several strands of tow are placed at one time in order to lay down a wider strip. A head on a tow placement device arrays a group of prepreg tows into a continuous band and compacts them against the surface of the form or layup tool.

A disadvantage of conventional tow placement devices is that resin from the prepreg tows may foul components along the path from the spool to the compaction roller. Another disadvantage of conventional tow placement devices is that the head only dispenses one width of tow. When composite items requiring other tow widths are fabricated, another head may be required. Changing the width of the tow is a time consuming and labor intensive task.

Accordingly, it is desirable to provide a method and apparatus capable of overcoming the disadvantages described herein at least to some extent.

SUMMARY OF THE INVENTION

According to a number of embodiments, a device may include a frame, a frame fastener, and a tray fastener. The frame fastener may fasten the frame to a positioning device. The tray fastener may releasably fasten a tow alignment tray to the frame. The tow alignment tray may align a predetermined width of tow.

According to other embodiments, a kit may include a tow alignment tray to guide a predetermined width of tow along a tow path of a tow placement head. The tow alignment tray may include a channel having a width corresponding to the predetermined width of tow and a fastener to releasably engage the tow placement head.

According to still other embodiments, a system may include a tow placement head, a positioning device, and a kit. The tow placement head may apply a predetermined width of tow to a tool. The positioning device may position the tow placement head. The kit may include a tow alignment tray. The tow alignment tray may guide the predetermined width of tow along a tow path of the tow placement head. The tow alignment tray may include a channel and a fastener. The channel may have a width corresponding to the predetermined width of tow. The fastener may releasably engage the tow placement head.

According to a number of methodology embodiments, a kit may be installed in a tow placement head. The kit may include a tow alignment tray to guide a predetermined width of tow along a tow path of a tow placement head. The tow alignment tray may include a channel having a width corresponding to the predetermined width of tow and a connector to releasably engage the tow placement head. In the method, the kit may be installed in a tow placement head and this installation includes detachably securing the tow alignment tray on the tow placement head via the connector.

According to other methodology embodiments, an aircraft structure may be manufactured from a composite. In this methodology, a laminating apparatus may be provided, an alignment tray may be mounted, and tow may be applied. The laminating apparatus may include a form, a placement head, and a plurality of alignment kits. The form may provide a surface upon which the aircraft structure is formed. The placement head may place tow on the form. Each of the alignment kits may include an alignment tray that may be adapted to align a tow of predetermined size and may be releasably mountable to the placement head. The alignment tray from one of the alignment kits may be mounted on the placement head. The tow may be applied to form the aircraft structure.

According to still other embodiments, a laminating apparatus for manufacturing an aircraft structure may include a placement head and a plurality of alignment kits. Each of the alignment kits may including an alignment tray that is adapted to align a tow of predetermined size and releasably mountable to the placement head.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

Figure 1A:
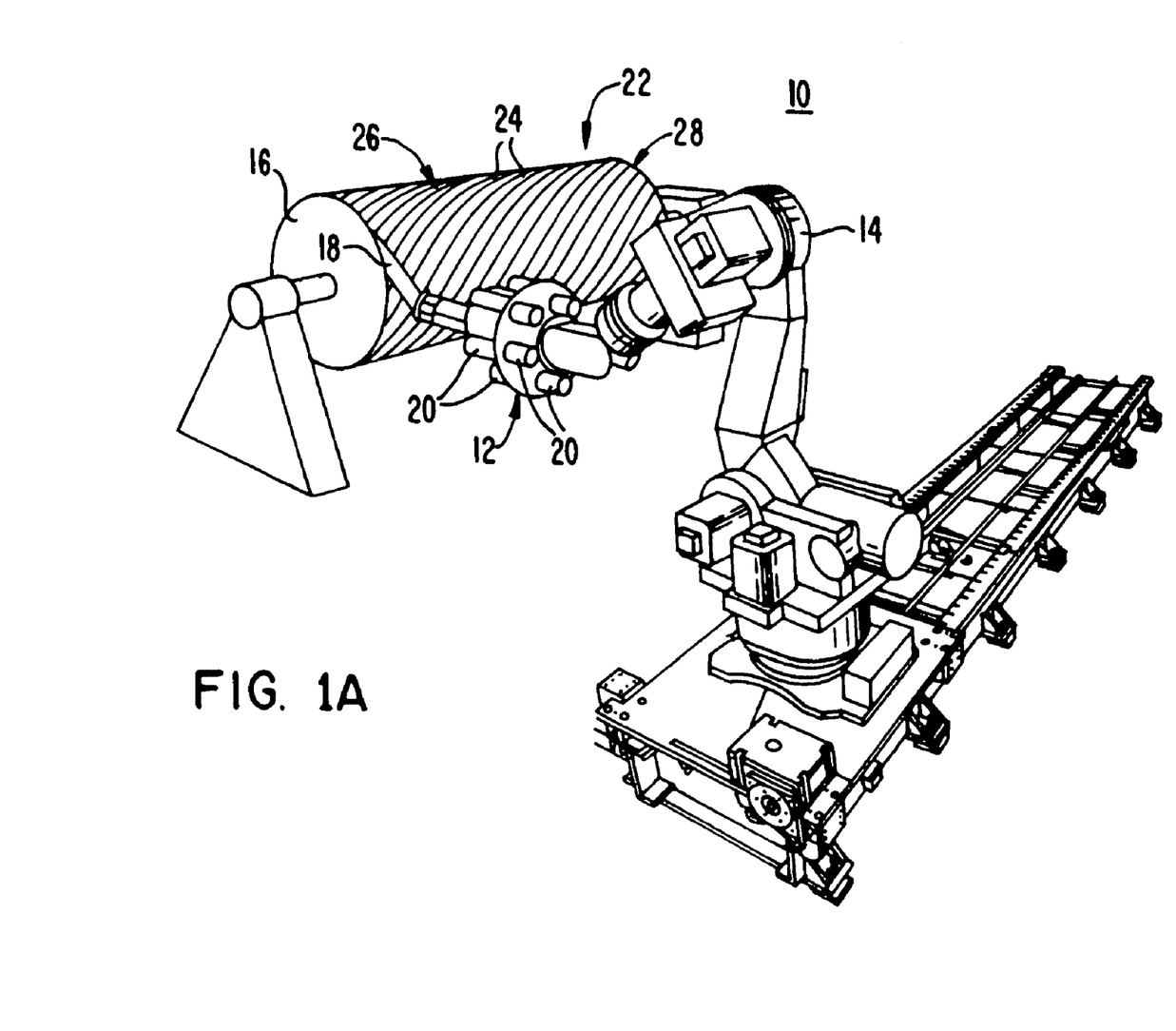
FIG. 1A is a perspective view of a laminating system according to an embodiment of the invention.
Figure 1B:
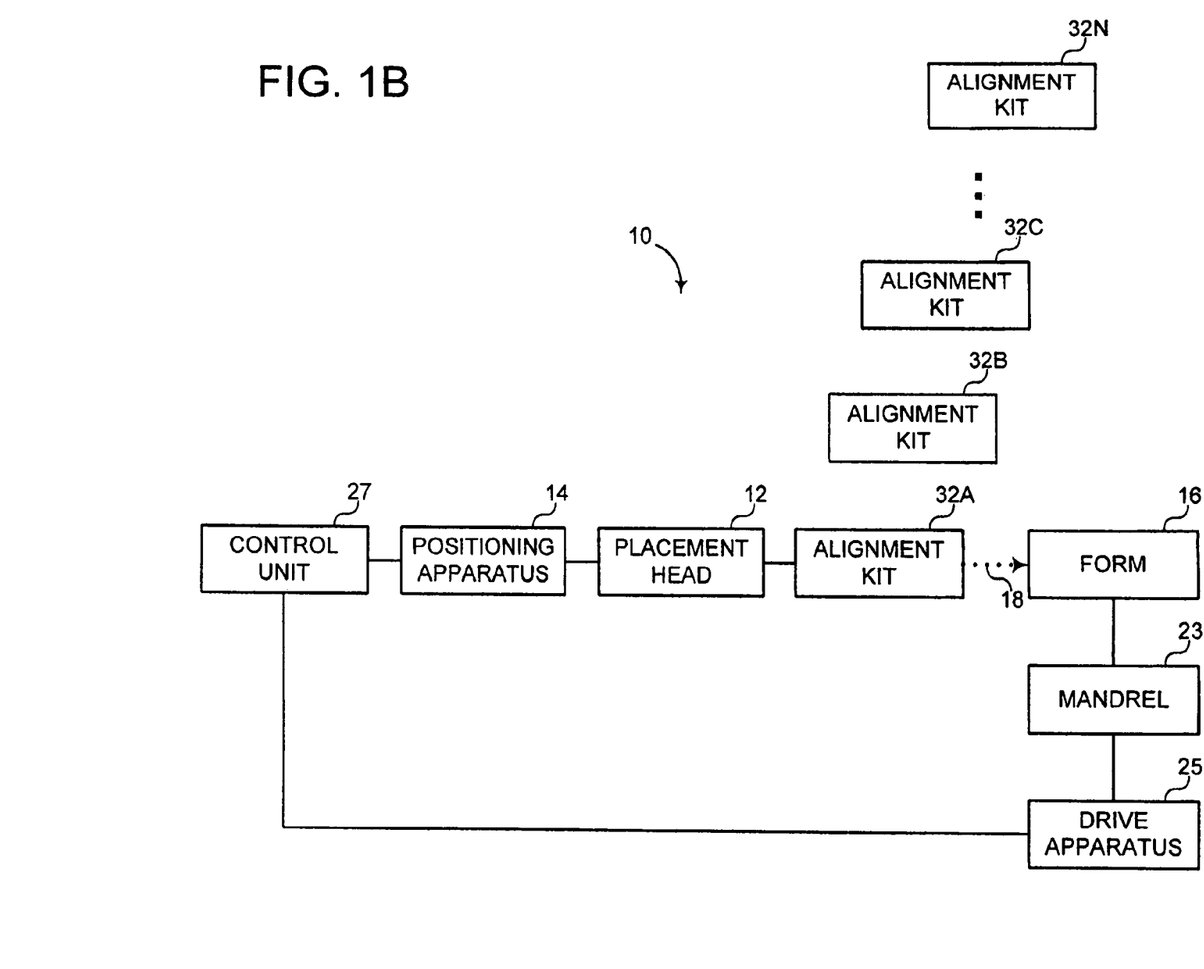
FIG. 1B is a block diagram of a system for making items from composites.

The invention will now be described with reference to the drawing figures, in which like reference numerals refer to like parts throughout. As shown in FIGS. 1A and 1B, a laminating system 10 according to a number of embodiments may include a tow placement head 12, positioning device 14, and form 16. The tow placement head 12 may be configured to align and place a predetermined width of a tow 18 on the form 16. The tow 18 may be stored on and dispensed from one or more spools 20. A composite item 22 may be fabricated by placing the tow 18 from the spools 20 onto the form 16 and then performing a curing procedure. The curing procedure may be varied according manufacturers specifications. For example, curing bismaleimide (BMI) resins typically includes subjecting the component to elevated heat and pressure.

The positioning device 14 may include any suitable device to position the tow placement head 12 relative to the form 16. Suitable positioning devices include a robotic armature as illustrated in FIG. 1A, gantry-type devices, and the like. In an embodiment of the invention, the positioning device 14 may be a robotic armature or gantry-type positioning device configured to control three to ten or more axes of movement. However, it is to be understood that the specific number of axes may depend upon the particular operating condition and thus, the number of axes controlled is not critical to the invention.

The form 16 may include any suitable form or tool upon which the tow 18 is placed. In some of the embodiments as shown in FIG. 1B, the form 16 may be mounted on a mandrel 23 that can be moved and/or rotated by a drive apparatus 25. In addition, a control unit 27 may be in communication with the positioning apparatus and the drive apparatus 25 to control the production or manufacture of a composite item or component.

The tow 18 may be placed upon the form 16 in a plurality of courses 24 to generate a layer or ply 26. Generally, items such as the composite item 22 may be fabricated from multiple plies 26. Typically, the surface of the form 16, the courses 24 and/or plies 26 may be referred to as a substrate 28 upon which subsequent courses of the tow 18 are placed. As shown in FIG. 1A, the form 16 may be controlled to rotate about an axis A. When controlled to rotate thusly, the form 16 is typically referred to as a mandrel. In other embodiments, the form 16 may be stationary or controlled to move in various axes. For example, the form 16 may be secured to a sliding table or X-Y table. In this regard, these and other embodiments in which the form 16 and/or the tow placement head 12 may be controlled to move, one relative to the other, are within the scope of the invention.

In some of the embodiments, the control unit 27 may control and move the positioning device 14 and the form 16 in concert to position the tow placement head 12 relative to the form 16. In other embodiments, the control unit 27 may move the positioning apparatus 14 and the form 16 in a coordinated manner so they operate essentially as a single unit. Accordingly, for the purpose of this disclosure, control of the positioning device 14 and/or the form 16 will be referred to with respect to the positioning device 14. Characteristics of the form 16, such as size, shape, contour, and the like, may be based upon design parameters of the composite item 22 to be manufactured.

Figure 2A:
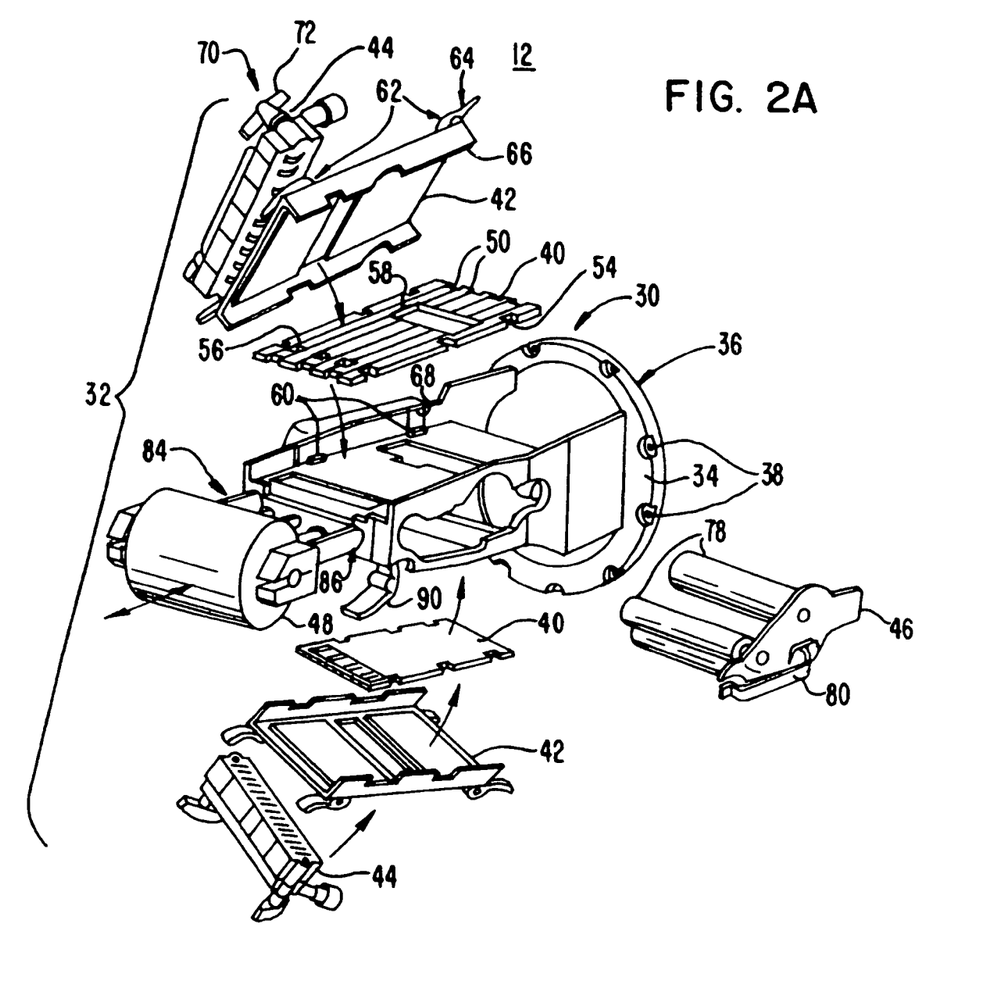
FIG. 2A is an exploded detailed view of a placement head for use is a plurality of alignment kits.

FIG. 2A illustrates a number of embodiments of the tow placement head 12 that may be used with the laminating system 10 of FIGS. 1A and 1B. As shown in FIG. 2A, the tow placement head 12 may include an adaptable main frame structure ("frame") 30 and a tow alignment path kit 32. As shown in FIG. 1B, the laminating system 10 may include a plurality of alignment kits 32a, 32b, 32c, ... 32n each adapted to lay up a particularly sized tow, which is discussed in more detail below. The frame 30 may be configured to provide support for the various parts of the tow alignment path kit 32 and provide connection points for the various connectors of the tow alignment path kit 32. In addition, the frame 30 may include a connector frame 34 to engage and attach the frame 30 to a typical robotic adaptor connector of the tow placement head 12. According to an embodiment, the connector frame 34 may include a flange 36 with a series of recessed throughbores 38 to accept fasteners, such as, for example, screws, bolts, and the like.

Figure 2B:
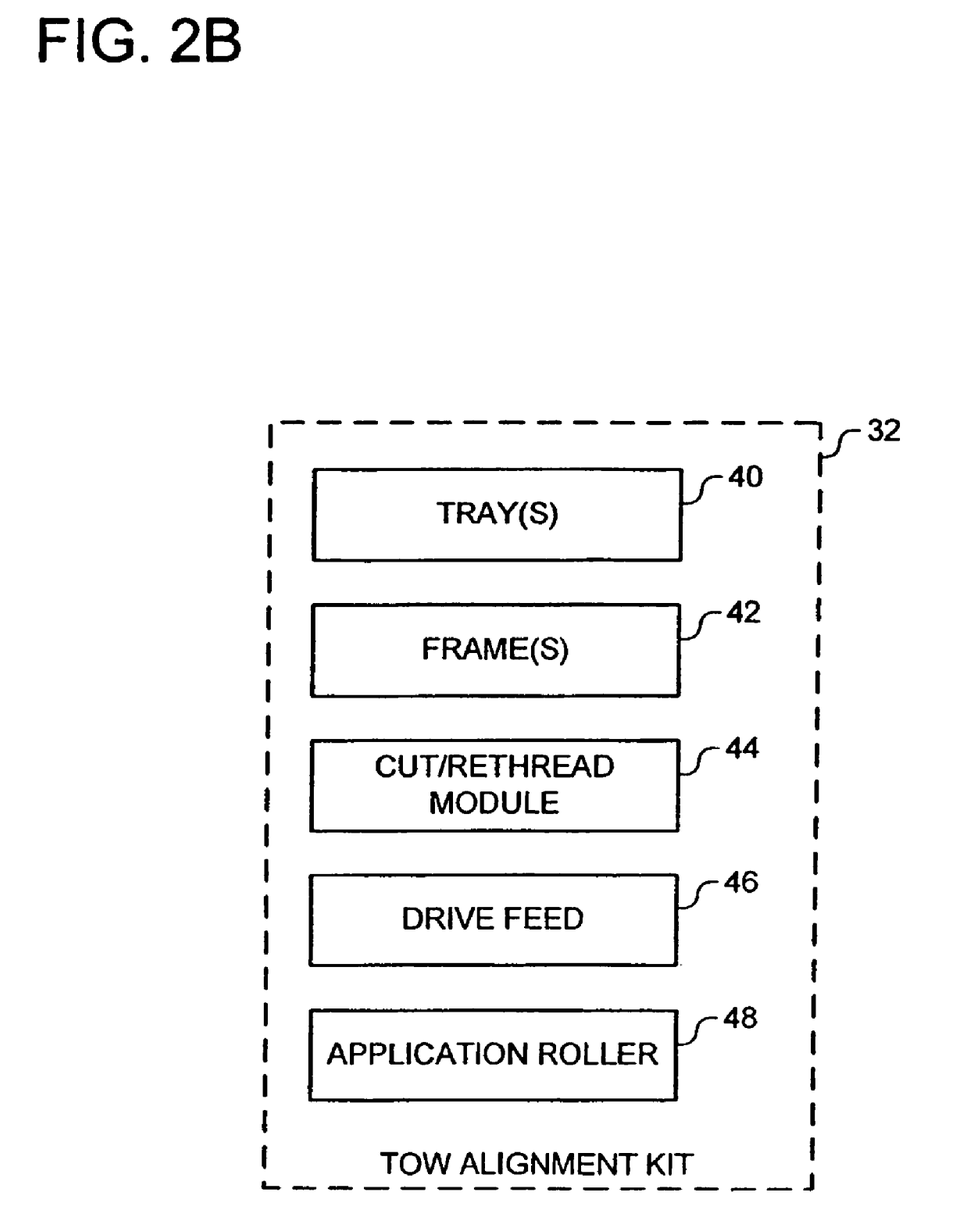
FIG. 2B is block diagram of an alignment kit according to a number of embodiments.

In the following description of a particular embodiment of the tow alignment path kit 32, an example is provided in which several components are present in pairs. That is, two fiber alignment plates may be utilized in an embodiment to create a space clearance equal to the width of one fiber tow. The clearance is used for cutter and rethread mechanisms. The trays together produce a weave. The end result is the generation of a single tape band from a plurality of tows. However, in various other embodiments, some or all of the components may be present as single, paired, or multiple components and all such embodiments are within the scope of the invention. In a number of embodiments as shown in FIG. 2B, the tow alignment path kit 32 may include one or more tow alignment trays ("trays") 40, one or more index and key lock frames ("index frames") 42, one or more tow cutter/rethread modules 44, a servo drive feed ("drive") 46, and an application roller ("roller") 48.

The trays 40 facilitate alignment of the tow 18. For example, each tray 40 may include one or more channels 50 that guide the tow 18 to the roller 48 via the drive 46 and the tow cutter/rethread modules 44. The channels 50 include any suitable structure configured to retain the tow 18 in alignment. Suitable structures include, for example, channels, grooves, slots, combs, and the like. The channels 50 include a surface that is compatible for use with the tow 18. For example, ultra high molecular weight plastic ("UHMW") plastic is generally compatible with BMI and other resin systems. In some embodiments, all or most of the tray 40 may be UHMW plastic. For example, an advantage of injection molded UHMW trays 40 is that the trays 40, while sufficiently robust for multiple cleaning procedures and reuses, are sufficiently inexpensive to allow for single-use. Disposable or single use trays essentially eliminate tray cleaning procedures and thus, save time and expenses associated with the tray cleaning procedures such as, for example, labor costs, expensive solvents, disposal of solvent and resin contaminated cleaning materials. In other embodiments, the tray 40 may include a layer or coating of UHMW plastic.

The trays 40 optionally include indexing points 54, drive windows 56 and 58. If present, the indexing points 54 facilitate positioning the trays 40 upon the frame 30. For example, as shown in FIG. 2A, the indexing points 54 include notches configured to mate with respective tabs 60. In another example, the indexing points 54 include bores or pins configured to mate with respective pins or bores. The drive windows 56 and 58 may be optionally included to provide an opening for the drive 46 to contact the tow 18. In other instances in which, for example, the drive 46 may be disposed relatively above the channels 50, the drive window 58 may be omitted. Depending upon the configuration of the tow cutter/rethread modules 44, one or more cutter recesses may be provided to facilitate proper operation of the tow cutter/rethread modules 44. That is, if some portion of the tow cutter/rethread modules 44 operate below the surface of the tray 40, the cutter recesses accommodate that the operation of the tow cutter/rethread modules 44. In other instances in which the tow cutter/rethread modules 44 do not operate below the surface of the tray 40, the cutter recesses may be omitted.

The index frames 42 facilitate detachably securing respective ones of the trays 40 to the frame 30. For example, the index frames 42 include one or more quick-release type fasteners ("fasteners") 62. In various embodiments, the fasteners 62 include any suitable fastening device or devices that facilitate detachably securing the index frames 42 and respective trays 40 to the frame 30. Preferably, both detaching and securing operations may be easily performable without the use of tools and in an expedient manner. For example, as shown in FIG. 2A, the fasteners 62 include hand-operable camming devices with a cam 64 and a rotatable pawl 66 that is configured to engage a catch 68. In operation, during assembly, the pawl 66 may be rotated to a non-engaging position, the index frame 42 may be disposed upon the frame 30 with the tray 40 captured therebetween, the pawl 66 is rotated into an engaging position, and the cam 64 is depressed to draw the pawl 66 against the catch 68. In this manner, the tray 40 and index frame 42 may be easily and expeditiously detachably secured to the frame 30. Similarly, disassembly may be performed without the use of tools and in an expedient manner.

An amount of force exerted by the pawl 66 upon the catch 68 ("$F_{pc}$") may be modulated in any suitable manner. For example, in an embodiment, the $F_{pc}$ may be user modulated in response to how far the cam 64 is depressed. In another example, the $F_{pc}$ may be set at a predetermined level and fully depressing the cam 64 generates the $F_{pc}$ in a repeatable manner. Examples of suitable quick-release type fasteners are, at least, to be found at Southco of Concordville, Pa, USA.

Figure 3A:
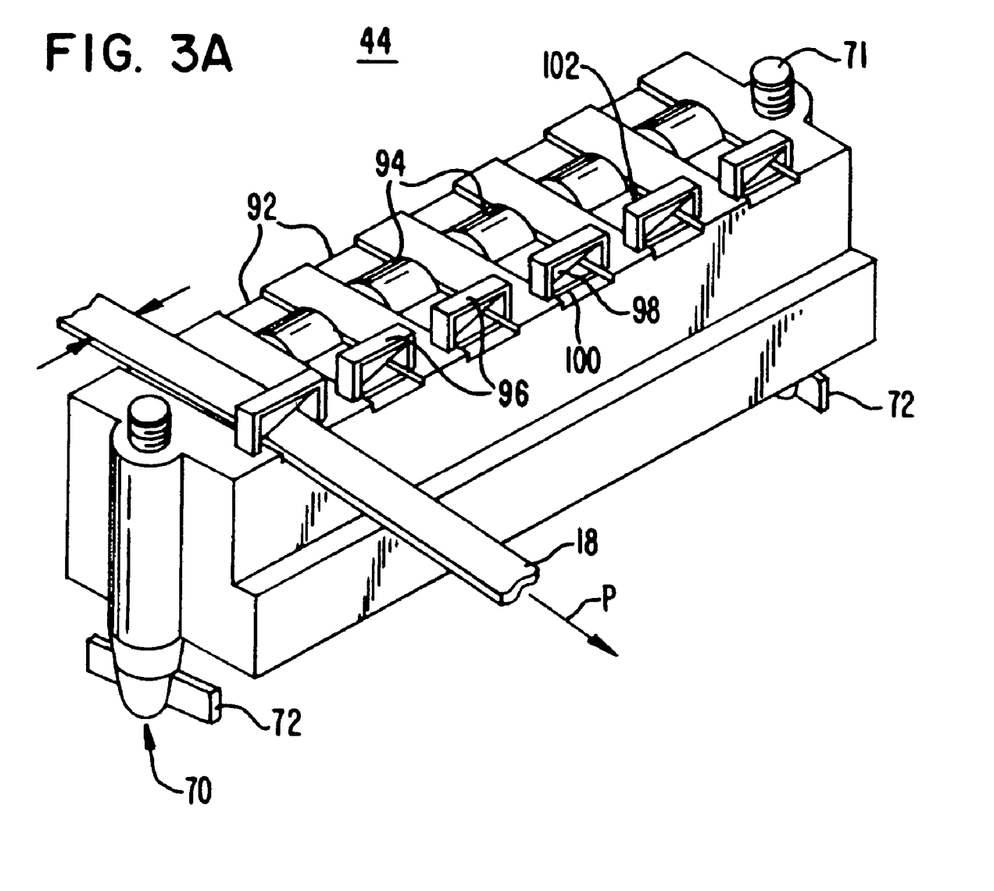
FIG. 3 is a detailed view of a cut/rethread module according to a number of embodiments.

The tow cutter/rethread modules 44 are described in greater detail herein with reference to FIG. 3A. In general, the tow cutter/rethread modules 44 cut, clamp, and rethread the tow 18. The tow cutter/rethread modules 44 include one or more fasteners 70 to detachably secure the tow cutter/rethread modules 44 to the frame 30 and/or to detachably secure the tow cutter/rethread modules 44 to intervening components. In an embodiment, the fasteners 70 may be similar to the fasteners 62 utilized on the index frame 42. In another example, the fasteners 70 may include a "T" handle or toggle 72 to rotate a threaded shaft 71 that is shown and described herein. This threaded shaft 71 may be configured to mate with a threaded bore.

Figure 3B:
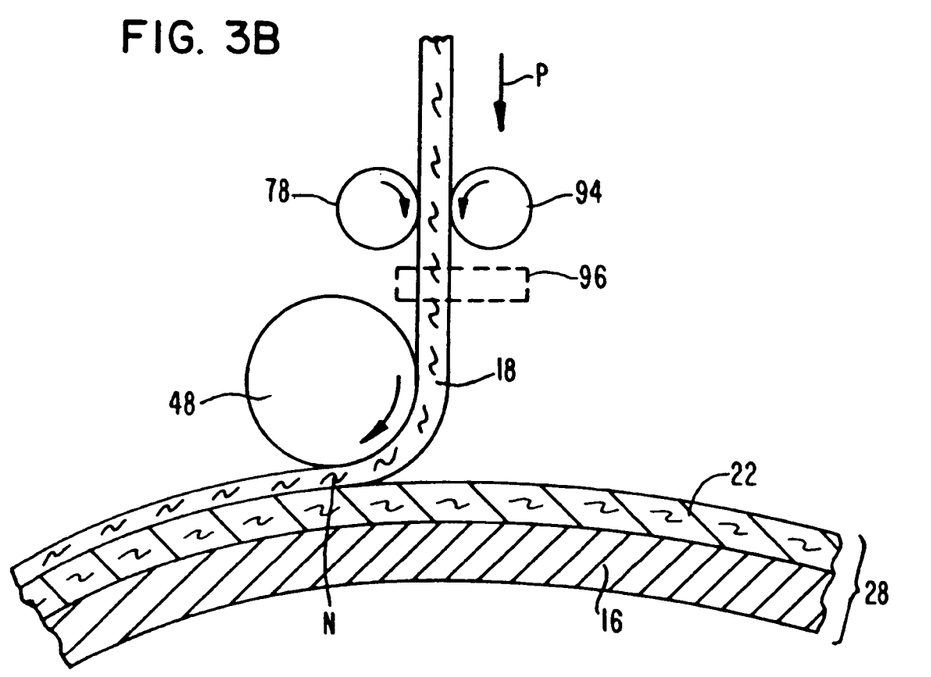

With additional reference to FIG. 3B, the drive 46 may be configured to engage the tow 18 and urge the tow 18 along a tow path indicated by arrow P. In this regard, the drive 46 may include one or more servo driven rollers 78. In an embodiment, the rollers 78 may be a single servo driven roller with its speed matched to output tow through put speed. The tow 18 may then be driven out to compaction roller 48. In addition, the drive 46 may include a fastener 80 to detachably secure the drive 46 to the frame 30. For example, as shown in FIG. 2, the fastener 80 may include a handled latch to facilitate assembly and disassembly in an easy and expeditious manner.

Once a tow band is aligned and formed from the plurality of tows 18, it may be presented under the compaction roller 48 at the nip point (indicated by N) between the substrate 28 or part surface and a contact surface of the roller 48. The compaction roller 48 provides a bearing surface to urge the tow 18 towards the form 16 and thereby apply the tow 18 upon the substrate 28. The compaction roller 48 may include a tab 84 configured to mate with a slot 86. To detachably secure the tab 84 within the slot 86, the frame 30 optionally may include a fastener 90. The fastener 90 may be similar to the fastener 62, in that, the fastener 90 may be a quick-release type fastener. For example, the fastener 90 may include a camming device and pawl similar to the cam 64 and pawl 66.

It is an advantage of various embodiments that, with changes in tow width, the width of the compaction roller 48 width is operable to be changed out. In this regard, the slot 86 and associated roller parts may be sized for the largest width and adaptable to the smaller width by exchanging the compaction roller 48. That is, the dimensions of, at least, the tab 84 and the slot 86 may be based on the widest width of the tow 18 and/or course 24. When placing relatively narrower width of the tow 18 and/or course 24, a narrower compaction roller 48 may be utilized. This narrower compaction roller 48 may include a tab 84 configured to mate with the relatively wide slot 86. In this manner, the frame 30 may facilitate the use of the variously sized tow alignment kits 32A to 32n.

It is an advantage of the various embodiments that some or all of the components of the tow alignment path kit 32 may be quickly and easily removable and replaceable. That is, in the event that a component, such as the trays 40, become fouled with resin or otherwise rendered inoperable, the trays 40 may be quickly and easily removed and replaced. In prior art systems, the removal and cleaning of components is so time consuming and difficult that components may be typically cleaned in place if possible. While this prior art process results in considerable downtime, it is still more efficient than disassembly/re-assembly of prior art tow placement devices.

In addition, the tow alignment path kit 32 may be adaptable for different widths of the tow 18. That is, for example, a first tow alignment path kit 32a may be operable to dispense $\frac{1}{8}^{th}$ inch tow, a second tow alignment path kit 32b may be operable to dispense ¼ inch tow, and a third tow alignment path kit 32c may be operable to dispense ½ inch tow. Thus, when one or the other width tow is required, the first, second, or third tow alignment path kit 32a, 32b, 32c may be installed as appropriate. Similarly, additional kits (e.g., kit 32n) operable to dispense other width of the tow 18 may be included and are within the scope of various embodiments of the invention.

FIG. 3A is a detailed view of a cut/rethread module suitable 44 for use with the laminating system 10 of FIG. 1. As shown in FIG. 3A each strip of the tow 18 may be threaded along a respective channel 92, past a tow activation roller ("roller") 94, and through a cut/clamp device 96. The channel 92 facilitates alignment of the tow 18. In operation, activation of the rollers 94 facilitate clamping the tow 18 between roller 78 and roller 94 as shown in FIG. 3B. The roller 94, in various embodiments may be free rolling, rolls in one direction only, and/or controlled to roll via a servo or other such actuator. Each of the cut/clamp devices 96 (shown schematically in FIG. 3B) may include an actuator to urge a blade 98 towards the tow cutter/rethread module 44 and into a cutter slot 100. In this manner, the tow 18 threaded through the respective cut/clamp device 96 may be cut as the blade 98 passes through the tow 18 and into the slot 100. To retain the tow 18 in a ready position for rethreading operation, the cut/clamp device 96 may include a clamping portion to retain the tow 18. That is, an axial projection 102 at the base of the blade 98 may be configured to clamp the tow 18 against the channel 92 and retain the tow 18 therein. In operation, this clamping process may occur at or near the completion of the cutting operation. To rethread, the cut/clamp device may be returned to the extended position and the drive 46 may be controlled to advance the tow 18. In this manner, some or all of the tows 18 may be cut and rethread according to design parameters of the composite item 22.

Figure 4A:
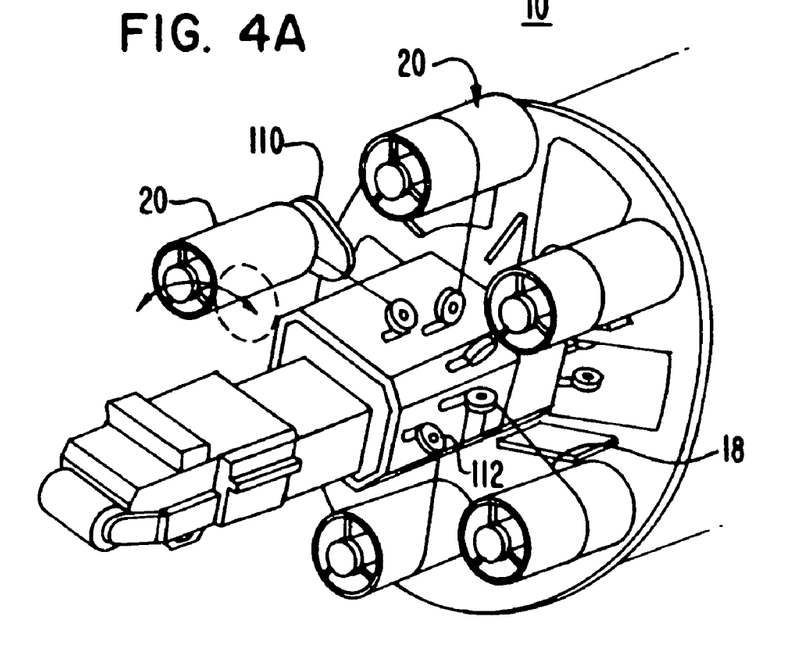
FIG. 4A is a detailed view of an adjustable spool supply suitable for use with the laminating system of FIG. 1.
Figure 4B:
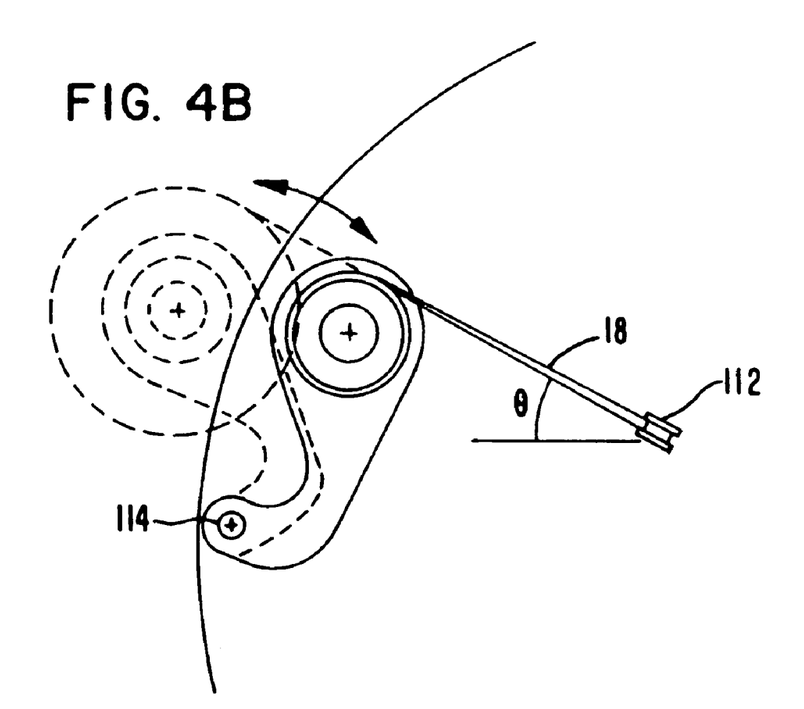
FIG. 4B is a simplified view of an adjustable spool supply suitable for use with the laminating system of FIG. 1.

FIGS. 4A and 4B are detailed views of an adjustable spool supply suitable for use with the laminating system 10 of FIG. 1. As shown in FIGS. 4A and 4B, the spools 20 are mounted on respective support arms 110. As strands of the tow 18 are drawn off the respective spools 20, the tow 18 may be each redirected by a respective centerline caster mount 112 and eventually culminated and applied to the form 16 to form the course 24. To accommodate variations in diameters of the spools 20, the support arms 110 maybe pivotal about an axis 114. As shown in FIG. 4B, pivoting the support arm 110 in response to variations in spool 20 diameter allows an angle Θ at which the tow 18 approaches the centerline caster mount 112 to remain essentially constant. In an embodiment, the support arm 110 may be initially set and locked into position. In another embodiment, the support arm 110 may be modulated in response to the diameter of the spool 20. That is, the diameter of the spool 20 may be sensed and/or determined and the support arm 110 may be controlled to pivot in response to the diameter of the spool 20.

Figure 5:
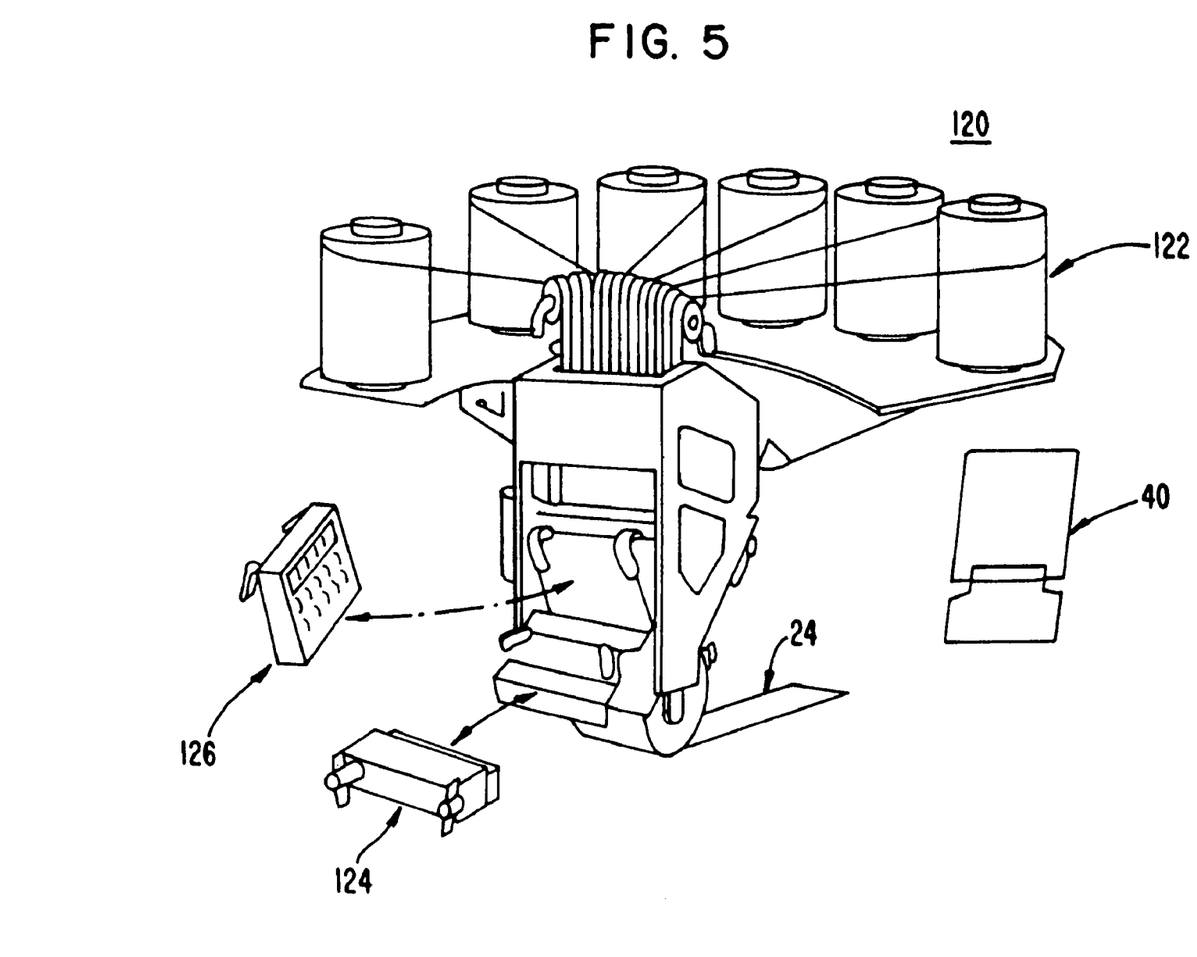
FIG. 5 is an exploded detailed view of an end effector according to an embodiment of the invention.

FIG. 5 is an exploded detailed view of an end effector 120 according to an embodiment of the invention. As shown in FIG. 5, the end effector 120 may be similar to the tow placement head 12 described herein and thus, in the interest of brevity, only those aspects that differ will be described hereinbelow. The end effector 120 may include the fiber alignment tray 40, a plurality of spools 122, a cutter/clamp module 124 and a rethread module 126. As shown in FIG. 5, the spools 122 may be optionally arranged to one side of the end effector 120. Arranged in this manner, the end effector 120 may be operable to mate with gantry-type positioning systems through a typical robotic coupling device and method.

The cutter module 124 and the rethread module 126 this embodiment may be separate modules. By utilizing separate modules, the overall complexity of each may be reduced.

Figure 6:
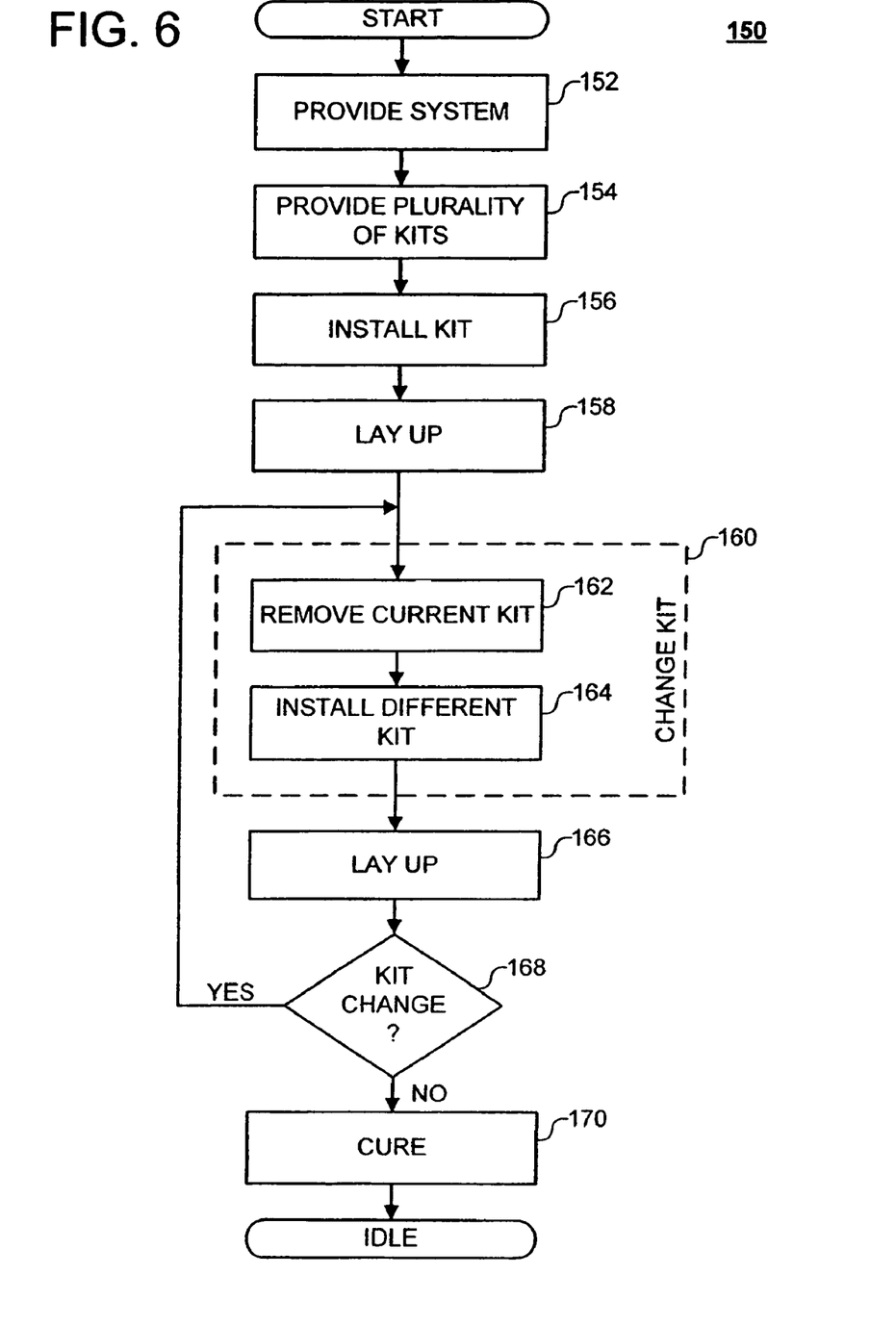
FIG. 6 is a flow diagram of a method of use according to an embodiment of the invention.

A number of embodiments of methodology 150 for manufacturing a composite item 22 is shown in FIG. 6. A manufacturer may first provide 150 a laminating system 10 according to the embodiments described above or according to know laminating systems. If the latter, a conventional laminating system requires modification to operate with the alignment kits 32. The manufacturer may then provide 154 one or more of the alignment kits 32. Depending on the composite item 22 to be manufactured, the kit 32 configured for use with a desired tow 18 may then be selected and installed 156 on the placement head 12. A layup procedure 158 may then be initiated by, for example, activating the control unit 27.

Depending upon the composite item 22, a single kit 32 may be used for the entire procedure, or, alternatively, the kit 32 may be changed out 160. To change out a kit 32, the current kit 32 can be removed 162 and a new kit 32 for use with a desired tow can then be installed 164. A subsequent lay up procedure 166 can then be initiated with the new tow for the same composite item or for another composite item. The changing out of kits 32 may continue 168 until the composite item 22 is ready for curing 170.

Figure 7:
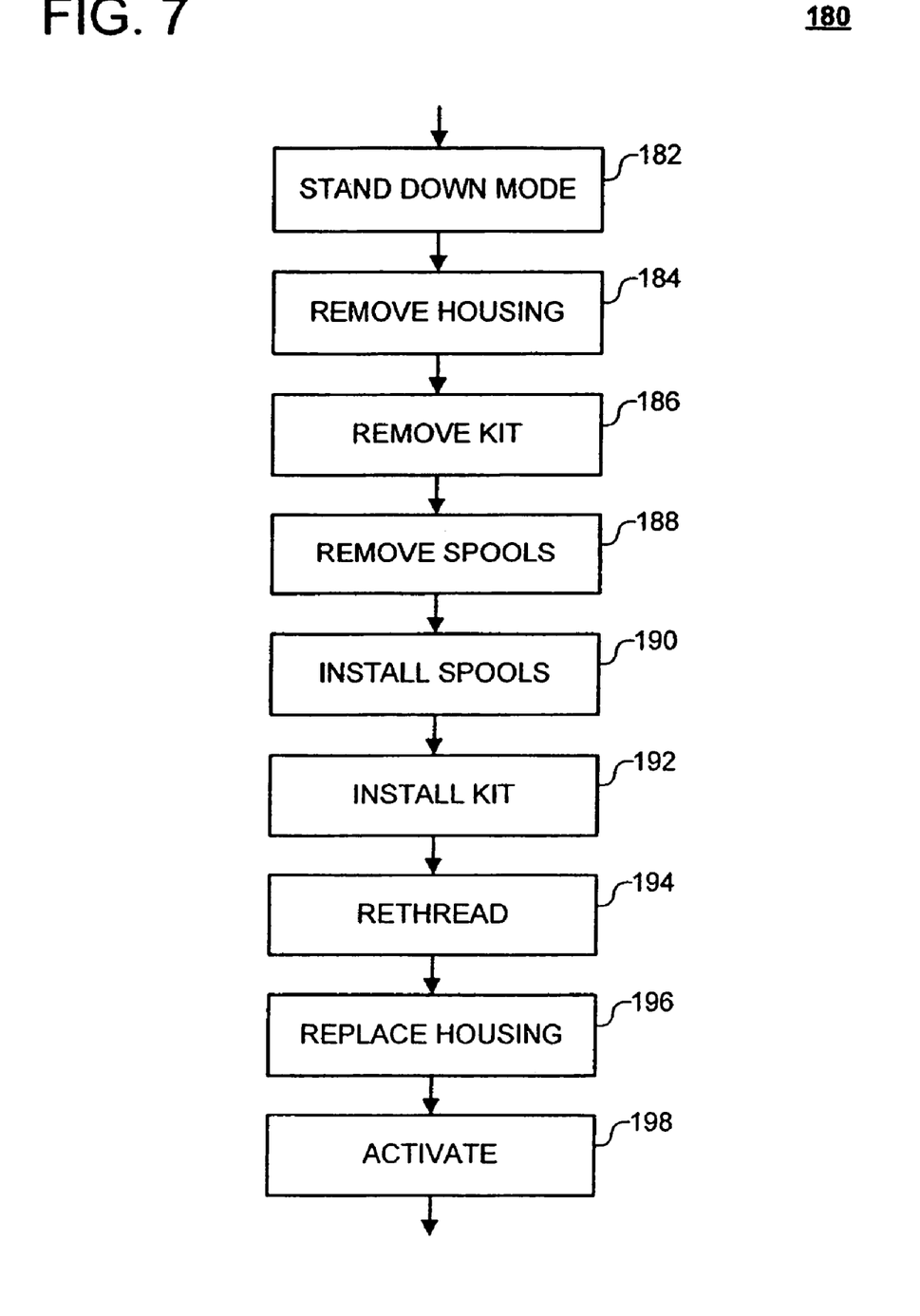
FIG. 7 is a flow diagram of a method of changing an alignment kit according to an embodiment of the invention.

A number of embodiments of methodology 180 for changing a kit 32 is shown in FIG. 7. The laminating system 10 may be controlled 182 to stand down or otherwise stop placing the tow 18 and position the tow placement head 12 for changing the tow path alignment kit 32. For example, the control unit 27 may control the positioning device 14 to stand down. A housing, if present, may be removed 184 from the tow placement head 12 to gain access to the tow alignment kit 32 and/or the spools 20.

The tow alignment kit 32 may be removed 186. For example the fasteners 70 may be unlatched to remove the tow cutter/rethread modules 44, the fasteners 62 may be unlatched to remove the index frames 42. Removal of the various components of the tow alignment kit 32 may proceed thusly until removal of the tow alignment kit 32 is complete. In addition, the spools 20 may be removed 188 from the support arms 110.

Depending upon specifications of the composite item 22, another set of spools 20 having an appropriate tow for subsequent lay up may be selected and installed 190 on the support arms 110. For example, a composite airframe may include a release agent ply, multiple structural plies, a conductive mesh ply, a finish ply, and the like. Depending upon which of these plies is to be placed on the substrate 28, the set of spools 20 may be selected accordingly. The support arms 110 may, optionally, be adjusted to modulate the angle Θ.

In various embodiments, installation 192 of a different tow alignment kit 32A to 32n and rethreading 194 of the tow 18 may be performed essentially together or one operation following the other. That is, the particular order of installation 192 and rethreading 194 may depend upon the specific configuration of the lamination system 10. As a variety of configurations are within the scope of the various embodiments thus, the particular order in which the tow alignment kit 32 is installed 192 and the tow 18 is rethreaded 194 is not important to the invention.

If present, the housing may be replaced and the lamination system 10 may be activated 198 or idled as appropriate.

The many features and advantages of the invention are apparent from the detailed specification, and thus, it is intended by the appended claims to cover all such features and advantages of the invention that fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A plurality of kits for a tow placement head, each respective kit comprising:

a tow alignment tray configured to guide a predetermined width of tow along a tow path of the tow placement head, each respective kit being configured to accept a different predetermined width of tow, the tow placement head being configured to place a first predetermined width of tow in response to installation of a first kit of the plurality of kits and the tow placement head being configured to place a second predetermined width of tow in response to installation of a second kit of the plurality of kits, the second predetermined width of tow being different than the first predetermined width of tow;

the tow alignment tray being detachably securable to the frame.

2. The kit according to claim 1, further comprising:
a compaction roller configured to apply the predetermined width of tow upon a tool, the compaction roller including a fastener to releasably engage the tow placement head.

3. The kit according to claim 1, further comprising:
a tow cutter to cut the predetermined width of tow.

4. The kit according to claim 3, further comprising:
a rethreading unit to rethread the predetermined width of tow in response to the predetermined width of tow being cut;
a drive unit to advance the respective predetermined width of tow; and
wherein the tow alignment tray, tow cutter, rethreading unit, and drive unit each include a universal quick-release fastener.

5. An end effector for attachment to a positioning device, the device end effector comprising:
a frame;
a frame fastener to fasten the frame to the positioning device; and
a first tow path kit configured to connect to the frame, the first tow path kit being configured to accommodate a first predetermined width of tow, the end effector being configured to dispense the first predetermined width of tow in response to the first tow path kit being connected to the frame, the first tow path kit comprising:
a first tow alignment tray to align the first predetermined width of tow, the first tow alignment tray being detachably securable to the frame;
a second tow path kit configured to connect to the frame, the second tow path kit being configured to accommodate a second predetermined width of tow that is different than the first predetermined width of tow, the end effector being configured to dispense the second predetermined width of tow in response to the second tow path kit being connected to the frame, the second tow path kit comprising:
a second tow alignment tray to align the second predetermined width of tow, the second tow alignment tray being detachably securable to the frame.

6. The end effector according to claim 5, further comprising:
a first rethreading unit to rethread the first predetermined width of tow in response to the first predetermined width of tow being cut;
a first drive unit to advance the first predetermined width of tow;
wherein the first tow alignment tray, first rethreading unit, and first drive unit each include a universal quick-release fastener to fasten to the frame;
a second rethreading unit to rethread the second predetermined width of tow;
a second drive unit to advance the second predetermined width of tow; and wherein the second tow alignment tray, second rethreading unit, and second drive unit each include a universal quick-release fastener to fasten to the frame.

7. The end effector according to claim 5, further comprising:
a fastener to releasably fasten a compaction roller to the frame, the compaction roller being configured to apply a predetermined width of tow upon a tool.

8. The end effector according to claim 5, further comprising:
a first tow cutter being configured to cut the first predetermined width of tow; and
a second tow cutter being configured to cut the second predetermined width of tow.

9. The end effector according to claim 5, further comprising:
an index frame mountable to the frame, the first and second tow alignment trays being configured to be captured between the index frame and the frame such that the first and second tow alignment trays are detachably securable to the frame.

10. The end effector according to claim 9, further comprising:
a quick-release fastener for detachably securing the first and second tow alignment trays to the frame.

11. The end effector according to claim 10, wherein:
the quick-release fastener comprises:
a pawl and a cam included with the index frame;
a catch included with the frame;
the cam being configured to draw the pawl against the catch for detachably securing the first and second tow alignment trays to the frame.

12. The end effector according to claim 5, wherein:
the frame includes at least one tab;
the tow alignment tray including at least one indexing point for mating with the tab.

13. The end effector according to claim 12, wherein:
the tow alignment tray is formed of injection molded ultra high molecular weight plastic.

14. A system comprising:
a tow placement head including a frame;
a positioning device to position the tow placement head;
a first tow path kit corresponding to a first predetermined width of tow, the first tow path kit comprising:
a first tow alignment tray configured to guide the first predetermined width of tow along a tow path of the tow placement head, the tow placement head being configured to dispense the first predetermined width of tow in response to the first tow path kit being installed on the tow placement head, the first tow alignment tray being detachably securable to the frame; and
a second tow path kit corresponding to a second predetermined width of tow being different than the first predetermined width of tow, the second tow path kit comprising:
a second tow alignment tray configured to guide the second predetermined width of tow along the tow path of the tow placement head, the tow placement head being configured to dispense the second predetermined width of tow in response to the second tow path kit being installed on the tow placement head, the second tow alignment tray being detachably securable to the frame.

15. The system according to claim 14, further comprising:
a compaction roller configured to apply a predetermined width of tow upon a tool, the compaction roller including a fastener to releasably engage the tow placement head.

16. The system according to claim 14, further comprising:
an adjustable spool supply configured to accommodate variations in a diameter of a spool of the predetermined width of tow, the adjustable spool supply being disposed upon the tow placement head.

17. The system according to claim 14, further comprising:
a first tow cutter to cut the first predetermined width of tow; and
a second tow cutter to cut the second predetermined width of tow.

18. A laminating apparatus for manufacturing an aircraft structure, the apparatus comprising:
a tow placement head; and
a plurality of tow path kits, each of the tow path kits including an alignment tray being detachably securable to the tow placement head, each tow path kit
being adapted to a tow of a predetermined width that is different from the predetermined width of a remainder of the plurality of tow path kits.

19. The laminating apparatus according to claim 18, wherein each of the tow path kits further comprises a tow cutter, a rethreading unit, and a drive unit.

* * * * *